United States Patent
Lee et al.

(10) Patent No.: US 7,238,765 B2
(45) Date of Patent: Jul. 3, 2007

(54) HIGH DENSITY POLYETHYLENE AND INSULATION COMPOSITIONS FOR WIRE AND CABLE

(75) Inventors: Chun D. Lee, Cincinnati, OH (US); Timothy S. Schloemer, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 352 days.

(21) Appl. No.: 10/911,997

(22) Filed: Aug. 5, 2004

(65) Prior Publication Data

US 2005/0009973 A1  Jan. 13, 2005

Related U.S. Application Data

(63) Continuation-in-part of application No. 10/360,017, filed on Feb. 6, 2003, now abandoned.

(51) Int. Cl.
*C08F 210/16* (2006.01)
*C08K 5/13* (2006.01)
*C08K 5/23* (2006.01)

(52) U.S. Cl. ............. 526/348; 526/348.2; 526/348.5; 526/348.6; 521/95; 521/142; 521/143; 521/144; 524/323; 524/351; 525/376; 525/384

(58) Field of Classification Search ............. 526/348, 526/348.2, 348.5, 348.6; 521/95, 142, 143; 521/144; 524/323, 351; 525/376, 384
See application file for complete search history.

(56) References Cited

U.S. PATENT DOCUMENTS

| | | | |
|---|---|---|---|
| 3,642,729 A | 2/1972 | Wismer et al. | |
| 3,644,323 A | 2/1972 | Norwood et al. | |
| 3,652,214 A | 3/1972 | Aboutboul et al. | |
| 3,704,287 A | 11/1972 | Johnson et al. | |
| 3,985,676 A | 10/1976 | Rickers et al. | |
| 4,318,845 A | 3/1982 | Spivack et al. | |
| 5,895,770 A * | 4/1999 | Pullukat et al. | ............. 502/103 |
| 2004/0158016 A1 | 8/2004 | Lee et al. | |

OTHER PUBLICATIONS

US2004/0158016 corresponds to U.S. Appl. No. 10/360,017, filed Feb. 6, 2003.
Muller, H., Dr.: *Plastics Additive Handbook*: Chapter 2, pp. 75-95. Edited by R. Gachter & H. Muller. Hanser Publishers (1987).
Brown, G.D.: *International Wire & Cable Symposium Proceedings 1987*: "Performance of HDPE Insulation Antioxidants in Filled Telephone Cable Applications," pp. 337-343.
Harrell, E.R., et al.: "Modified Cole-Cole Plot Based on Viscoelastic Properties for Characterizing Molecular Architecture of Elastomers," *J. of Applied Polymer Science*: vol. 29: pp. 995-1010 (1984).
Shroff, R., et al.: "New Measures of Polydispersity from Rhelogical Data on Polymer Melts," *J. of Applied Polymer Science*, vol. 57: pp. 1605-1626 (1995).
Nakajima, N.: "Modified Cole-Cole Plot as a Tool for Rhelogical Analysis of Polymers," *Current Topics in Polymer Science*, pp. 150-165, 1987.
Yau, W.W., et al.: "New Approaches Using MW-Sensitive Detectors in GPC-TREF for Polyolefin Characterizations" *Polymer*: 42, pp. 8947-8958 (2001).
Han, Chan Dae, et al.: Temperature-Independent Correlation of Elastic Responses of Viscoelastic Liquids, *Polymer Engineering Reviews*, vol. 2, No. 2: pp. 135-165 (1982).

* cited by examiner

*Primary Examiner*—Roberto Rabago
(74) *Attorney, Agent, or Firm*—Gerald A. Baracka; William A. Heidrich

(57) ABSTRACT

High density polyethylene having reduced melt elasticity and a reduced level of highly short-chain branched polymer molecules and wire and cable insulation compositions based thereon having improved strippability and oxidative stability are provided.

21 Claims, No Drawings

HIGH DENSITY POLYETHYLENE AND INSULATION COMPOSITIONS FOR WIRE AND CABLE

CROSS-REFERENCE TO THE RELATED APPLICATION

This is a continuation-in-part application of U.S. Ser. No. 10/360,017 filed Feb. 6, 2003 now abandoned.

BACKGROUND OF THE INVENTION

1. Field of the Invention

The present invention relates high density polyethylene (HDPE) useful for insulating wire and cable. More particularly, the HDPE resins of the invention are useful for telecommunication cables and, by virtue of their unique combination of melt elasticity and short-chain branching characteristics, have improved strippability and improved oxidative stability upon exposure to water-blocking cable filler compounds.

2. Description of the Prior Art

HDPE is widely used as the insulation material for various types of wire and cable. The resin can be extruded onto the metal conductor as a single layer, two layers as with "foam/skin" constructions or three layers as with "skin/foam/skin" constructions. In foamed applications the foamed polymer is surrounded with a thin outer layer of solid polymer or "skin." Foamed constructions are particularly advantageous for telecommunication applications since the inner foam layer decreases the electrical capacity of the overall insulation which allows closer spacing of the insulated conductors in the telephone cable. The foam and skin layers are applied using high speed coextrusion processes.

Telephone "singles" are produced by extrusion coating 19, 22, 24 or 26 AWG copper wire with either solid or foam/skin HDPE insulation to a thickness of from 5 to 15 mils. These are commonly uniformly twisted into pairs and 25 or more pairs are bundled in a metallic or plastic sheath to produce the telecommunication cable. The exterior jacket provides mechanical protection for the individual conductors within.

In addition to other requirements, the insulated wires used for telecommunications must meet certain thermal oxidative stability and insulation adhesion standards. Insulation adhesion is important since it determines the "strippability" of the wire, i.e., the amount of force necessary to strip the insulation from the conductor. Standards published by the Insulated Cable Engineers Association, Inc., for example, specify that adhesion of insulation to a 24 AWG conductor should be such that a force not exceeding 3 lb/ft (13 Newtons) is required to strip the insulation from the conductor when tested in accordance with ASTM D 4565. Strip force standards are also published for other gauge wires.

Thermal stability requirements are based on the correlation of accelerated testing studies with field experience and, in this area, the oxidative induction time (OIT) test is generally recognized as the industry standard.

Stabilizers are incorporated into the HDPE insulation to provide oxidative stability. Combinations of primary antioxidants of the phenolic type and metal deactivators are typically employed to protect against oxidative degradation of the HDPE. Combinations of pentaerythrityl tetrakis[3(3',5'-di-t-butyl-4'-hydroxyphenyl)propionate] (IRGANOX 1010) and N,N'-bis[3,(3',5'-di-t-butyl-4'-hydroxyphenyl) propionyl]hydrazine (IRGANOX MD 1024) have been shown to be effective. A discussion of primary antioxidant/metal deactivator combinations is provided in Chapter 2 of the *Plastics Additives Handbook*, edited by R. Gächter and H. Müller, Hanser Publishers (1987), and in an article by G. D. Brown, *International Wire and Cable Symnposium Proceedings* 1987, pp. 337-343.

A second type of degradation, referred to as "treeing," is also known to occur with polyolefin insulated wires and cables. This type of deterioration is caused by moisture and, to prevent or minimize this problem, various water-blocking filling compounds are forced under pressure into the telecommunication cable cores to surround the individual insulated conductors and fill the voids and interstices therein. The water-blocking filling compounds are usually hydrocarbons of a heavy oil or waxy constistency. While these cable fillers have generally proven to be effective water-blocks, they have a tendency to extract the stabilizer(s) and thus, in time, reduce oxidative stability of the insulation materials. Whereas the oxidative stability of the insulation may be initially adequate, upon exposure to the water-blocking agent for a period of time, there can be a significant decrease in stabilizer protection which can lead to premature catastrophic failure.

To overcome this problem and provide improved oxidative stability when insulated conductors are exposed to water-blocking fillers work has focused on developing improved stabilizer packages where combinations of specific antioxidants are employed.

It would be highly useful if HDPE insulation resins were available which exhibited improved oxidative stability upon exposure to water-blocking fillers. It would be even more advantageous if the insulation compositions also had improved strippability. These and other advantages are obtained with the improved HDPE resins of the invention and insulation compositions prepared therewith which are described in detail to follow.

SUMMARY OF THE INVENTION

The present invention relates to improved high density polyethylene resins having densities from 0.935 to 0.960 g/cm$^3$ and melt index from 0.2 to 2 g/10 min and further characterized by having a melt elasticity of 4.5 or below and a highly branched short-chain branched fraction eluted over the temperature range 45 to 85° C. of 25 wt. % or less relative to the total area under the TREF curve generated for the short-chain branched fractions over the temperature range 35 to 120° C. More specifically, the resins are copolymers of ethylene with butene-1, hexene-1 or octene-1. Preferred resins of the invention are copolymers of ethylene and hexene-1 having densities from 0.940 to 0.955 g/cm$^3$, melt indexes from 0.5 to 1.0 g/10 min, melt elasticities from 3.0 to 4.5 and highly branched short-chain branched fractions from 15 to 25 wt. %.

Insulation compositions comprising the above defined high density polyethylene resins and one or more hindered phenol stabilizers are also disclosed. Insulations containing 100 to 9000 ppm hindered phenol having one or more substituted phenyl groups of the formula

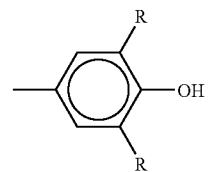

where R is a $C_{1-4}$ alkyl group exhibit improved strippability and oxidative stability, particularly upon exposure to water-blocking filler compounds. Insulation compositions stabilized with a combination of tetrakis[methylene(3,5-di-t-butyl-4-hydroxyhydrocinnamate)]methane and N,N'-bis[3,(3',5'-di-t-butyl-4'-hydroxyphenyl)propionyl]hydrazine are particularly useful.

Foamable high density insulation compositions containing 100 to 9000 ppm hindered phenol stabilizer and 0.2 to 3 wt. % chemical foaming agent are also disclosed. Especially useful foamable insulation is obtained when the chemical foaming agent is azodicarbonamide present from about 0.5 to 2.5 wt. %, based on the weight of the ethylene copolymer resin.

DETAILED DESCRIPTION OF THE INVENTION

HDPE resins used for the invention are obtained by the so-called Phillips' process which utilizes chromium or modified chromium catalysts on a silica or silica-alumina support for the low pressure polymerization of ethylene in solution or slurry reactors. Slurry processes are also referred to as particle form polymerizations. The chromium catalysts are typically prepared by impregnating the support with a solution of a chromium compound and then activating by calcining in air.

Phillips' HDPE polymerization processes are well known and described in the prior art, e.g., U.S. Pat. No. 3,644,323. In general the polymerizations are carried out in a liquid organic medium at temperatures from about 150 to 350° F. and 100 to 800 psig. The chromium catalyst is suspended in the organic medium and the reaction conducted at a pressure sufficient to maintain the organic diluent and at least a portion of the olefin in the liquid phase. The weight percentage of ethylene in the reactor is generally maintained from about 1.5 up to about 7. A small amount of one or more other $C_{4-8}$ α-olefins is included with the ethylene.

Hydrogen is generally added during in the polymerization reaction to control molecular weight and other modifiers may be included as well. The molar weight ratio of hydrogen to ethylene in the reactor is generally maintained between 0.25 and 1.0. The organic medium is generally a paraffinic and/or cycloparaffinic material such as propane, butane, isobutane, pentane, isopentane, cyclohexane, methylcyclohexane, and the like. In the slurry process, the medium is chosen so that under the conditions employed the polymer is insoluble in the medium and readily recoverable in the form of solid particles. Isobutane is particularly advantageous for these polymerizations. Catalyst concentrations can range from about 0.001 to about 1 percent of the reactor contents. The polymerizations can be conducted as batch, continuous or semi-continuous operations using vertically or horizontally configured reactors.

Catalysts employed are conventional chromium catalysts obtained by depositing a chromium compound onto an inorganic support material having surface hydroxyl groups. Known chromium-containing compounds capable of reacting with the surface hydroxyl groups of the support material are employed. The chromium-containing support is generally activated by heating at a temperature above about 450° F. but below the decomposition temperature of the support. The supported chromium catalyst may be modified by including one or more metal and/or non-metal compounds.

Useful inorganic supports include inorganic oxides such as silica, alumina, silica-alumina mixtures, thoria, zirconia and comparable oxides which are porous, have a medium surface area, and have surface hydroxyl groups. Silica xerogels such as those described in U.S. Pat. No. 3,652,214 which have surface areas in the range of 200 to 500 $m^2/g$ and pore volumes greater than about 2.0 cc/g are also highly useful.

Any chromium-containing compound capable of reacting with the surface hydroxyl groups of an inorganic support can be used for the catalyst. Examples of such compounds include chromium trioxide, chromium nitrate, chromate esters such as the hindered di-tertiary polyalicyclic chromate esters, chromium acetate, chromium acetylacetonate, t-butyl chromate, silyl chromate esters and phosphorus-containing chromate esters such as disclosed in U.S. Pat. Nos. 3,642,749 and 3,704,287, organophosphoryl chromium compounds such as disclosed in U.S. Pat. No. 3,985,676, and organochromium compounds, such as chromocene.

Aluminum compounds are commonly included as modifiers with the chromium compound. Any aluminum compound capable of reacting with the surface hydroxyl groups of the inorganic support material can be used. Highly useful aluminum compounds correspond to the formula:

$$Al(R)_a(OR)_b(Z)_c$$

wherein R is an alkyl or aryl group having from one to eight carbon atoms, Z is H or a halogen, a is 0-3, b is 0-3, c is 0-3, and a+b+c equals 3. Examples of such aluminum compounds include aluminum alkoxides such as aluminum sec-butoxide, aluminum ethoxide, aluminum isopropoxide; alkyl aluminum alkoxides such as ethyl aluminum ethoxide, methyl aluminum propoxide, diethyl aluminum ethoxide, diisobutyl aluminum ethoxide; alkyl aluminum compounds such as triethyl aluminum, triisobutyl aluminum; alkyl or aryl aluminum halides such as diethyl aluminum chloride; aryl aluminum compounds such as triphenyl aluminum, aryloxy aluminum compounds such as aluminum phenoxide; and the like.

Other metal components can also be used to modify the chromium catalyst, such as titanates and zirconates of the formula $$(R_1)_n Me(OR_1)_m$$

where Me is titanium or zirconium; $R_1$ is a hydrocarbon radical selected from alkyl, cycloalkyl, aryl, aralkyl or alkaryl having from 1-12 carbon atoms; m is an integer from 1 to 4, n is an integer from 0 to 3 and m+n is equal to 4; and titanium or zirconium halides of the formula $$MeX_4$$

where Me is titanium or zirconium and X is chlorine, bromine, fluorine or iodine. Titanium and zirconium compounds represented by the formula $$Me(OR_2)_4$$

where Me is the same as defined above and $R_2$ is a $C_{1-7}$ alkyl group, such as, tetraethyl titanate, tetraisopropyl titanate, tetraisopropyl zirconate, tetrabutyl titanate, are conveniently deposited on the support by deposition from hydrocarbon solutions. Titanium and zirconium acetylacetonate compounds, such as titanyl acetylacetonate and titanium diacetylacetonate diisopropylate, can also be used to deposit these metals. Alkyl esters of boron wherein the alkyl group contains from 1 to 7 carbon atoms, such as trimethyl borate and triisopropyl borate, are also useful modifiers.

The above compounds can be deposited on the inorganic support by any suitable manner such as by vapor deposition or by impregnating the support with solutions of the metal containing compound.

The catalysts can contain from about 0.25 to 4 weight percent chromium; however, more typically Cr contents will range from 0.5 to 2.5 weight percent. Aluminum contents can range from 0.1 to 10% by weight but, more preferably, will be from about 0.5 to 5 weight percent. Other metal or non-metal modifiers will typically be used in amounts such that the metal/non-metal content is from 0.1 to 6 weight percent.

After the chromium compound and optional metal/non-metal compounds have been deposited on the inorganic support, the support is heated in a non-reducing atmosphere, preferably in an oxygen containing atmosphere, at a temperature above about 450° F. The temperature should not, however, exceed the decomposition temperature of the support. Typically, this heat activation procedure is carried out at temperatures from 450° F. to 1700° F. in dried (less than 2-3 ppm water) air. The heating time may vary depending on the temperature used but generally is for periods of 2 to 12 hours.

The heat-activated catalysts can be used by themselves or, as is more commonly the case, combined with a metallic and/or non-metallic reducing agents for the polymerization. Useful metallic reducing agents include trialkyl aluminums, such as triethyl aluminum and triisobutyl aluminum, alkyl aluminum halides, alkyl aluminum alkoxides, dialkyl zinc, dialkyl magnesium, and alkali metal borohydrides, especially borohydrides of sodium, lithium and potassium. Non-metallic reducing agents include alkyl boranes such as triethyl borane, triisobutyl borane, and trimethyl borane and hydrides of boron such as diborane, pentaborane, hexaborane and decaborane. The amount of metallic or non-metallic reducing agent will vary.

The improved HDPE insulation resins of the invention produced by the above-described polymerization process are copolymers of ethylene and α-olefins such as butene-1, hexene-1 or octene-1. Copolymers of ethylene and hexene-1 are particularly advantageous. The copolymers have densities from about 0.935 to 0.960 g/cm$^3$ and, more preferably, from 0.940 to 0.955 g/cm$^3$. Melt indexes will range from 0.2 to 2 g/10 min and, more preferably, be in the range 0.5 to 1.0 g/10 min determined in accordance with ASTM D 1238 at 190° C. and 2160 grams load.

The HDPE copolymer resins of the invention which exhibit improved strippability and oxidative stability upon exposure to water-blocking filler compounds are further characterized by having a unique combination of melt elasticity and short-chain branching (SCB) distribution.

More specifically, the melt elasticity (ER) of the HDPE resins of the invention will be 4.5 or less. ERs will typically range from 3.0 to 4.5 and, more preferably, will be in the range 3.5 to 4.2. This is in contrast to heretofore used HDPE insulation resins which typically have ERs from 4.6 to 5.0.

ER is an index of polydispersity derived from Theological data on polymer melts. It characterizes the breadth of the molecular weight distribution at the high molecular weight end and/or the presence of long-chain branching (LCB). Higher ER values are generally associated with broader molecular weight distributions (MWD) and/or higher LCB contents. ER is not influenced by SCB distribution.

Determination of ER requires frequency response data in the linear viscoelastic region. That is, ER is derived from the measured dynamic storage modulus, G', and loss modulus, G", as a function of frequency. Generally speaking, G' is a measure of energy stored and recovered per cycle of sinusoidal deformation and G" is a measure of energy dissipated or lost as heat per cycle. In one method, G' versus G" is plotted in logarithmic coordinates. Curves of this sort are generally known as Modified Cole-Cole Plots as described, for example, by E. R. Harrel, et al., in *Journal of Applied Polymer Science*, Vol. 29, pp. 995-1010 (1984); C. D. Han et al., in *Polymer Engineering Reviews*, Vol. 2, No. 2, pp. 135-165 (1982); and N. Nakajima, et al., in *Current Topics in Polymer Science*, Vol. II, Ottenbrite, et al., Eds., Hanser Publishers (1987), the contents of all of which are incorporated herein by reference, including ASTM D 4440-84 entitled "Standard Practice for Rheological Measurement of Polymer Melts Using Dynamic Mechanical Properties."

Polydispersity at the high molecular weight end is reflected as higher G' values. Procedurally, any rheometer capable of measuring dynamic mechanical properties of polymer melts over a wide range of frequencies can be used, such as Rheometrics Mechanical Spectrometer Model 605 or 705 or Rheometrics Dynamic Analyzer RDA2 or ARES Analyzer, all of which utilize discrete frequencies to cover the wide range.

As will be appreciated by those skilled in the art, if the plot of 1nG' versus 1nG" is even slightly nonlinear, the resulting ER may be unreliable; an indication of this is if the correlation coefficient of the first order 1nG' versus 1nG" fit is less than 0.999. Mathematically, ER can be computed by fitting 1nG' versus 1nG" for the nine lowest frequency points to a linear equation and extrapolating it to calculate G' at G"=5×10$^3$ dynes/cm$^2$. ER is then calculated from the equation:

$$ER=(1.781\times 10^{-3})G'\text{·at a value of }G''=5\times 10^3 \text{ dynes/cm}^2$$

In addition to having specific MWD/LCB characteristics as evidenced by their lower ER values, the HDPE resins of the invention also differ from heretofore used HDPE insulation resins in their SCB distribution. SCB is determined using a temperature rising elution fractionation (TREF) technique as described by Yau and Gillespie in their article entitled "New Approaches Using MW-Sensitive Detectors in GPC-TREF for Polyolefin Characterization" (Polymer 42 (2001) 8947-8958). The procedure utilizes a crystallization and redissolution process to separate polymers having different SCB contents. More specifically, the polymer is dissolved in a suitable solvent and injected onto a packed column which is slowly cooled. During the cooling, polymer fractions having different levels of SCB precipitate and coat the packing particles in layers with the most highly branched fraction precipitating out last to form the outermost layer in the column. The column is then subjected to a controlled heating and elution step where, as the temperature increases with time, the more highly branched molecules elute first followed by molecules having decreasing levels of SCB. By utilizing suitable detection means, typically an infrared detector, the polymer concentration over the elution temperature range can be plotted to provide an SCB distribution curve, i.e., TREF curve.

The HDPE resins of the invention which have improved properties exhibit a different SCB distribution as evidenced by the TREF curve generated over the temperature range 35 to 120° C. which encompasses the entire elution temperature range for the SCB fractions, i.e., all of the polymer fractions are eluted within this range. More specifically, in the area of the TREF curve attributed to the highly branched short-chain branched (HBSCB) polymers, i.e., the area over the elution range 45 to 85° C., the HDPE resins of the invention exhibit a significantly different distribution compared to heretofore available HDPE insulation resins. The present improved HDPE resins have HBSCB fractions of 25 wt. % or less relative to the entire area of the TREF curve and, more preferably, from 15 to 25 wt. % of the total area under the SCB-generated TREF curve. This is in contrast to previously produced HDPE resins used for this application which typically have HBSCB contents greater than 25 wt. % and often as high as 30 wt. % or above relative to the entire area of the TREF curve. In a highly useful embodiment of the invention, the HDPE resins have HBSCB contents which comprise 18 to 24 wt. % of the total area under the TREF curve and ERs from 3.0 to 4.5.

HDPE resins having the above-identified ER and SCB distribution are useful as insulation compositions for wire and cables and have particular utility as insulation materials for telecommunication applications. They possess excellent processing characteristics making them suitable for extrusion as a single layer of insulation around the metal conductor or as a foam/skin layer around said conductors. In the latter application the HDPE resins of the present invention can be used as the foam and/or skin layer. Moreover, insulation compositions formulated using the HDPE resins of the invention exhibit improved strippability and oxidative stability.

While the HDPE resins of the invention provide a good balance of processability and physical properties, further improvements are possible by the incorporation of one or more additional additives. These additives can include antioxidants, light stabilizing agents, optical brighteners, metal deactivators, foaming agents, lubricants, fillers, nucleating agents, pigments, antistatic agents, flame retardants and the like.

Antioxidants are typically used for insulation telecommunication compositions to provide stabilization during processing and over the life of the product. In general, from about 100 to about 9000 ppm and, more preferably, from about 500 to about 7000 ppm antioxidant or antioxidant combination will be used for this purpose. Hindered phenol compounds are most commonly employed for this purpose by themselves or in conjunction with hindered amines, thio compounds, phosphites, mercaptoimidazoles or the like. Any of the well known antioxidants having one or more hindered phenolic substituents can be used to stabilize the HDPE resins of the invention. A comprehensive list of such compounds reference may be found in U.S. Pat. No. 4,318,845.

Especially useful hindered phenol compounds contain one or more substituted phenyl groups of the formula

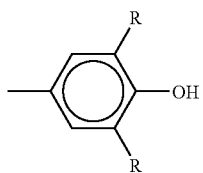

where R is a $C_{1-4}$ alkyl group and, most preferably, a tertiary butyl group. The R groups can be the same or different. Where more than one 3,5-dialkyl-4-hydroxyphenyl group is present, they will be joined through a linking group and the resulting compounds will correspond to the formula

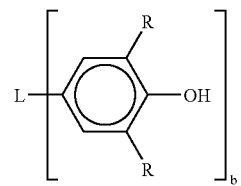

where b is an integer from 2 to 4, L represents the linking group and R is the same as defined above.

Representative linking groups include:

(a) —CH$_2$—

(b) C—(CH$_2$OCCH$_2$CH$_2$—)$_4$

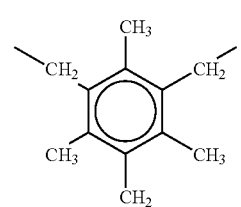

(c)

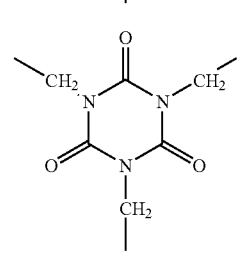

(d)

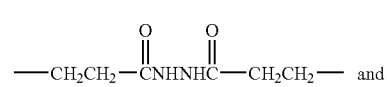

(e)

(f) —CH$_2$CH$_2$COCH$_2$CH$_2$—S—CH$_2$CH$_2$OCCH$_2$CH—.

It is especially advantageous when the above-identified linking moieties are substituted with 3,5-di-t-butyl-4-hydroxyphenyl groups.

Especially useful hindered phenol compounds of the above type which can be employed for the flame retardant products of the invention include:

4,4'-Methylenebis(2,6-di-t-butylphenol);
Tetrakis[methylene(3,5-di-t-butyl-4-hydroxyhydrocinnamate)]methane;
1,3,5-Trimethyl-2,4,6-tris(3,5-di-t-butyl-4-hydroxybenzyl)-benzene;
1,3,5-Tris(3,5-di-t-butyl-4-hydroxybenzyl)-s-triazine 2,4,6 (1H,3H,5H)trione;
N,N'-Bis[3-(3,5-di-t-butyl-4-hydroxyphenyl)propanyl] hydrazine;
Octadecyl 3,5-di-t-butyl-4-hydroxyhydrocinnamate; and
Thiodiethylene bis-(3,5-di-t-butyl-4-hydroxy)hydrocinnamate.

All of the foregoing materials are commercially available. For example, octadecyl 3,5-di-t-butyl-4-hydroxyhydrocinnamate and tetrakis[methylene (3,5-di-t-butyl-4-hydroxyhydrocinnamate)]methane are sold by Ciba-Geigy under the respective trademarks IRGANOX 1076 and IRGANOX 1010. Thiodiethylene bis-(3,5-di-t-butyl-4-hydroxy)hydrocinnamate is sold by Ciba-Geigy under the trademark IRGANOX 1035.

In one highly useful embodiment, insulation compositions useful for telecommunication applications having superior oxidative stability are obtained utilizing a combination of from 100 to 5000 ppm tetrakis[methylene (3,5-di-t-butyl-4-hydroxyhydrocinnamate)]methane with 500 to 7000 ppm of the metal deactivating hindered phenol N,N'-bis[3,(3',5'-di-t-butyl-4'-hydroxyphenyl)propionate]hydrazine (IRGANOX MD 1024). HDPE resins of the invention containing these stabilizer combinations exhibit superior strippability and OIT values. Improved retention of OIT upon exposure to water-blocking fillers is also achieved when the HDPE resins of the invention are formulated with such stabilizer combinations.

Where foam/skin insulations are desired, the HDPE will be formulated with an appropriate chemical foaming agent in addition to the stabilizer or stabilizer package. Conventional foaming agents known for this purpose can be used and typically will be present from about 0.2 to 3 wt. %, based on the weight of the HDPE resin. Preferred foamable insulation compositions will contain 0.5 to 2.5 wt. % of the foaming agent. Choice of the foaming agent will depend on the application involved and, more particularly, the processing conditions employed. As will be apparent to those skilled in the art, various foaming agents have different activation temperatures and, therefore, a foaming agent with activation temperature consistent with the temperature at which the HDPE resin is processed and extruded is essential to avoid premature foaming and insure most efficient utilization of the foaming agent. The foaming agent is typically compounded with the HDPE resin prior to extrusion. This compounding operation is necessarily carried out at a temperature below the activation temperature of the foaming agent.

Azodicarbonamide is a highly useful and widely used chemical foaming agent for the production of foam/skin insulation due to its commercial availability and efficiency on a cost performance basis. Furthermore, it has a decomposition range of about 205-215° C. which is generally consistent with the processing/extrusion temperatures employed for coextruding HDPE foam/skin insulation. Modified azodicarbonamides are also useful. These are typically azodicarbonamides modified with silica or the like to minimize mold plateout, die blockage and screw buildup which can occur during continuous high speed extrusion processes. Modified azodicarbonamides can, for example, contain 20 wt. % silica and have particle sizes in the range 2.5 to 10 microns.

Other known foaming agents such as p-toluene sulfonyl semicarbazide, p,p'-oxybis(benzenesulfonyl hydrazide) and p-toluene sulfonyl hydrazide may also be used; however, the decomposition temperatures of the latter two compounds may be too low for all but specialty applications.

It has unexpectedly been discovered that by utilizing the above-characterized HDPE resins having ERs of 4.5 or below and HBSCB contents less than 25 wt. % that insulation compositions having improved strippability and oxidative stability are obtained. Furthermore, the insulation compositions produced in accordance with the invention retain a greater degree of their original oxidative stability when aged in the presence of water-blocking fillers.

The invention is further described and the benefits illustrated by the following examples which are not intended to be limiting. Those skilled in the art will recognize many variations which are within the spirit of the invention and scope of the claims. In these examples all parts and percentages are on a weight basis unless otherwise indicated.

The superior oxidative stability of the HDPE resins in the presence of water-blocking fillers was demonstrated using the OIT test in accordance with ASTM D 4565.

This procedure provides a rapid and convenient relative measure of the degree of stabilization of polymeric compositions utilizing thermal analysis to determine oxidative stability. The OIT test measures the time for the onset of oxidation of samples maintained at 200° C. in pure oxygen. Typically, stabilized HDPE insulation formulations will have OIT values of 100 minutes or above. Whereas OIT values of 100 minutes are acceptable and achievable using various antioxidant combinations, oxidative stability can decrease to unacceptable levels upon exposure to water-blocking greases. After 14 days exposure to water-blocking grease, OIT values can be reduced to less than 30 minutes with heretofore used HDPE resins. For commercial applications, an OIT value of greater than 40 minutes is generally considered to be necessary after 14 days exposure to grease fillers.

To evaluate the oxidative stability of the insulation compositions, 8 inch lengths of insulated wire were cut and bent into a U-shape and placed in a test tube containing a commercial filler grease so that the cut ends of the wire sample were outside the test tube. The filler grease was maintained at a temperature of 70° C. The volume ratio of the filler compound to insulation of the test specimen was approximately 100:1. Test specimens were removed after 7 and 14 days aging and evaluated for OIT at 200° C. in accordance with ASTM D 4565.

Two different commercial filler greases were used for the tests. The first grease, identified as Grease A, was Witco Gel II; a high melting point petroleum reinforced with amorphous polymers and elastomers. The second grease, identified as Grease B, was Flexgel III, a mixture of petroleum hydrocarbons and polyethylene/polybutene.

Strip force was determined in accordance with the insulation adhesion test of ASTM D 4565-11. Strip force values reported are in pounds.

All of the above tests were conducted using both solid and skin/foam insulated 24 AWG copper wire. Solid insulated wires were obtained using a Davis Standard single screw extruder (2.5 inch screw diameter; L/D 20:1) fitted with a 0.038 inch double angle die and operating at a line speed of 1000 ft./min. The die temperature was 232° C. The insulation layer was extruded to a uniform thickness of 10 mil. Skin/foam insulated wire was produced on a commercial wire coating line operating at a line speed of approximately 5500 ft./min. Temperature at the metering zones of the foam and skin extruders were 196° C. and 237° C., respectively. Thickness of the foamed layer contacting the copper conductor was 7 mil and thickness of the skin layer was 2 mil.

All of the HDPE insulation compositions, both inventive and comparative, employed in the examples contained 2500 ppm tetrakis[methyl(3,5-di-t-butyl-4-hydroxyhydrocinamate)]methane (IRGANOX 1010) and 3000 ppm N,N'-bis[3,(3',5'-di-t-butyl-4'-hydroxyphenyl)propionate]hydrazine (IRGANOX MD 1024). The foamable insulation compositions also contained 1.05 wt. % modified azodicarbonamide (Nonplateout CELOGEN AZ-760-A).

EXAMPLE 1

Preparation of HDPE Resin: HDPE resins having the requisite combination of melt elasticity and short-chain branching are produced by the particle form copolymerization of ethylene and hexene-1. For the polymerization, a vertical loop slurry reactor equipped with an impeller to provide turbulent flow within the reactor is employed and isobutane is used as the diluent. Temperature within the reactor is maintained between 208-212° C. A silica-supported aluminum modified chromium catalyst prepared in accordance with the procedure of Example 2 of U.S. Pat. No. 5,895,770 is employed. Based on an ethylene feed rate of 100 lbs/hr., hexene-1 is fed at a rate of 1 to 1.5 lbs/hr., catalyst is fed at a rate of 0.03 to 0.05 lb/hr. and triethylborane cocatalyst is fed at a rate of 0.01 to 0.05 lb/hr.

HDPE resin produced in accordance with the above procedure had a melt elasticity (ER) of 4.0 and contained 22 wt. % highly branched short-chain branched fraction (HB-SCB), i.e., the fraction obtained over the TREF elution range 45-85° C., relative to the total area of the SCB-generated TREF curve. The MI of the resin was 0.9 g/10 min and density was 0.947 g/cm³.

Preparation and evaluation of HDPE insulated wires: Solid insulated wires were produced using the above-identified HDPE resin and evaluated for strippability and oxidative stability. For comparative purposes a commercial HDPE resin (Equistar LR5900-00) widely used for insulation applications was also evaluated. The commercial resin had an ER of 4.6 and had a substantially higher HBSCB fraction. The HBSCB content for this resin was 28%. The resin had an MI of 0.7 g/10 min and density of 0.945 g/cm³.

Strip force and OIT test results obtained for 24 AWG solid insulated wire produced using the HDPE resin of the invention and the comparative commercial HDPE resin were as follows:

|  | HDPE of the Invention | Comparative HDPE |
| --- | --- | --- |
| Strip Force (lbs) | 2.2 | 3.2 |
| OIT (minutes) |  |  |
| Initial, i.e., unaged | 222 | 218 |
| Aged 7 days in Grease A | 76 | 63 |
| Aged 7 days in Grease B | 110 | 75 |
| Aged 14 days in Grease A | 47 | 30 |
| Aged 14 days in Grease B | 60 | 26 |

It is apparent from an examination of the above data that improved results are obtained using the HDPE resins of the invention versus the heretofore used commercial resin. Improved strippability, i.e., reduced strip force, is obtained and significantly improved oxidative stability is achieved upon exposure to the water-blocking fillers. Whereas OIT values of both the inventive and comparative resins is essentially the same at the outset, i.e., before exposure to the water-blocking greases, the insulation formulated using the HDPE resin of the invention retains a significantly higher proportion of its original OIT value when exposed to the water-blocking grease, particularly Grease B. For example, after 7 days exposure to Grease B, the HDPE insulation of the invention retained almost half of its original OIT value whereas the OIT of the comparative HDPE insulation was reduced to 35% of its original OIT. Moreover, after 14 days exposure to Grease B, the HDPE insulation of the invention still had an OIT of 60 minutes, which exceeds the generally recognized industry requirements for this test, whereas the 26 minute OIT value obtained for the comparative resin is well below the 40 minute industry standard.

EXAMPLE 2

Skin/foam insulated wires were manufactured as described above using the same HDPE resin of the invention as described in Example 1 as the foam layer. The 2 mil skin layer was the same commercial HDPE resin used in Example 1. For comparison, a skin/foam construction was produced wherein both the foam and skin layers were produced using the commercial HDPE resin used in Example 1. The skin/foam insulations were evaluated for strippability and oxidative stability in accordance with the above-described procedures and results were as follows:

|  | Commercial HDPE Skin with inventive HDPE Foam | Comparative HDPE Skin and Foam |
| --- | --- | --- |
| Strip Force (lbs) | 1.4 | 4.9 |
| OIT (minutes) |  |  |
| Initial, i.e., unaged | 215 | 203 |
| Aged 7 days in Grease A | 110 | 79 |
| Aged 7 days in Grease A | 104 | 72 |

The markedly improved strippability of the insulation produced using the HDPE resin of the invention as the foam layer is readily apparent from the above data. The fact that improved OIT results were obtained with the skin/foam insulations having the HDPE resins of the invention as the foam layer is an additional benefit, especially considering that the skin layer was the same in both cases.

Similar results are obtained with insulations wherein both the skin and foam layers are produced using the HDPE resins of the invention having the prescribed ER and SCB characteristics.

EXAMPLE 3

Skin/foam structures were produced in the same manner as described in Example 2 except that in this case the stabilizers used for the foam insulation layers were changed. In this case both the HDPE resin of the invention and the comparative HDPE resin were stabilized with 5000 ppm IRGANOX MD 1024 and 2000 ppm of hindered amine UV stabilizer.

Similar improvement in strippability was obtained with these formulations. The skin/foam insulation obtained using the HDPE resin of the invention as the foam layer had a strip force of 1.1 lbs whereas 4 lbs force was required to strip the skin/foam insulation having the commercial HDPE resin as the foam layer.

We claim:

1. An improved high density polyethylene resin having a density from 0.935 to 0.960 g/cm³ and melt index from 0.2 to 2 g/10 min and further characterized by having a melt elasticity of 4.5 or below and a highly branched short-chain branched fraction eluted over the temperature range 45 to 85° C. of 25 wt. % or less relative to the total area under the TREF curve generated for the short-chain branched fractions over the temperature range 35 to 120° C.

2. The resin of claim 1 which is a copolymer of ethylene and an α-olefin selected from the group consisting of butene-1, hexene-1 and octene-1.

3. The resin of claim 1 having a density from 0.940 to 0.955 g/cm³.

4. The resin of claim 1 having a melt index from 0.5 to 1.0 g/10 min.

5. The resin of claim 1 having a melt elasticity from 3.0 to 4.5.

6. The resin of claim 5 wherein the melt elasticity is from 3.5 to 4.2.

7. The resin of claim 1 wherein the highly branched short-chain branched fraction is from 15 to 25 wt. %.

8. The resin of claim 7 wherein the highly branched short-chain branched fraction is from 18 to 24 wt. %.

9. The resin of claim 2 wherein the high density polyethylene resin is an ethylene-hexene-1 copolymer having a density from 0.940 to 0.955 g/cm$^3$, melt index from 0.5 to 1.0 g/10 min, melt elasticity from 3.0 to 4.5 and highly branched short-chain branched fraction from 15 to 25 wt. %.

10. The resin of claim 9 wherein the melt elasticity is from 3.5 to 4.2 and the highly branched short-chain fraction is from 18 to 24 wt. %.

11. A high density polyethylene insulation composition comprising a copolymer of ethylene and an α-olefin selected from the group consisting of butene-1, hexene-1 and octene-1, said copolymer having a density from 0.935 to 0.960 g/cm$^3$ and melt index from 0.2 to 2.0 g/10 min and further characterized by having a melt elasticity of 4.5 or below and a highly branched short-chain branched fraction eluted over the temperature range 45 to 85° C. of 25 wt. % or less relative to the total area under the TREF curve generated for the short-chain branched fractions over the temperature range 35 to 120° C. and containing from 100 to 9000 ppm hindered phenol stabilizer containing one or more substituted phenyl groups of the formula

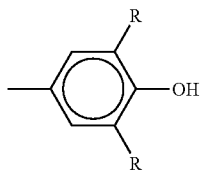

where R is a $C_{1-4}$ alkyl group.

12. The insulation composition of claim 11 wherein R is a tertiary butyl group.

13. The insulation composition of claim 11 wherein the copolymer has a density from 0.940 to 0.955 g/cm$^3$, melt index from 0.5 to 1.0 g/10 min, melt elasticity from 3.0 to 4.5 and highly branched short-chain branched fraction from 15 to 25 wt. %.

14. The insulation composition of claim 13 wherein the copolymer is an ethylene-hexene-1 copolymer having a melt elasticity from 3.5 to 4.2 and the highly branched short-chain branched fraction is from 18 to 24 wt. %.

15. The insulation composition of claim 12 containing from 100 to 5000 ppm tetrakis[methylene(3,5-di-t-butyl-4-hydroxyhydrocinnamate)]methane and from 500 to 7000 ppm N,N'-bis[3,(3',5'-di-t-butyl-4'-hydroxyphenyl)propionyl]hydrazine.

16. A foamable high density polyethylene insulation composition comprising a copolymer of ethylene and an α-olefin selected from the group consisting of butene-1, hexene-1 and octene-1, said copolymer having a density from 0.935 to 0.960 g/cm$^3$ and melt index from 0.2 to 2.0 g/10 min and further characterized by having a melt elasticity of 4.5 or below and a highly branched short-chain branched fraction eluted over the temperature range 45 to 85° C. of 25 wt. % or less relative to the total area under the TREF curve generated for the short-chain branched fractions over the temperature range 35 to 120° C. and stabilized with from 100 to 9000 ppm hindered phenol stabilizer containing one or more substituted phenyl groups of the formula

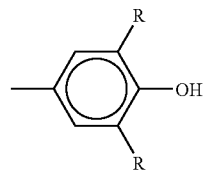

where R is a $C_{1-4}$ alkyl group, and 0.2 to 3 wt. %, based on the weight of the copolymer, chemical foaming agent.

17. The foamable insulation composition of claim 16 wherein the chemical foaming agent is azodicarbonamide.

18. The foamable insulation composition of claim 16 wherein the copolymer has a density from 0.940 to 0.955 g/cm$^3$, melt index from 0.5 to 1.0 g/10 min, melt elasticity from 3.0 to 4.5 and highly branched short-chain branched fraction from 15 to 25 wt. %.

19. The foamable insulation composition of claim 18 wherein the copolymer is an ethylene-hexene-1 copolymer having a melt elasticity from 3.5 to 4.2 and the highly branched short-chain branched fraction is from 18 to 24 wt. %.

20. The foamable insulation composition of claim 17 containing from 0.5 to 2.5 wt. % azodicarbonamide.

21. The foamable insulation of claim 20 containing containing from 100 to 5000 ppm tetrakis[methylene(3,5-di-t-butyl-4-hydroxyhydro-cinnamate)]methane and from 500 to 7000 ppm N,N'-bis[3,(3',5'-di-t-butyl-4'-hydroxyphenyl)propionyl]hydrazine.

* * * * *